United States Patent Office 3,629,242
Patented Dec. 21, 1971

3,629,242
6-GEM-DIFLUORO STEROIDS
John H. Fried, Palo Alto, Calif., assignor to
Syntex Corporation, Panama, Panama
No Drawing. Continuation-in-part of application Ser. No. 763,918, Sept. 30, 1968, which is a continuation-in-part of application Ser. No. 676,060, Oct. 18, 1967. This application Mar. 3, 1969, Ser. No. 803,953
Int. Cl. C07c 173/00
U.S. Cl. 260—239.55
20 Claims

ABSTRACT OF THE DISCLOSURE

6α,6β-difluoropregn-4-en-3-ones (substituted at C-21 with fluoro or chloro thereof, optionally substituted at C-16 with hydroxy or methyl, at C-17 with hydroxy or the esters thereof, optionally, C-16 and C-17 are bridged by a cyclic acetal or ketal, optionally there is a double bond between C-1,2), exhibit progestational activity.

---

This application is a continuation-in-part of my co-pending application Ser. No. 763,918, filed Sept. 30, 1968, which is, in turn, a continuation-in-part of application Ser. No. 676,060, filed Oct. 18, 1967, now abandoned.

The present invention relates to novel gem-difluoro steroid derivatives and to novel processes for the preparation thereof.

More particularly, the present invention relates to the novel 6α,6β-difluoro steroids of the following formula:

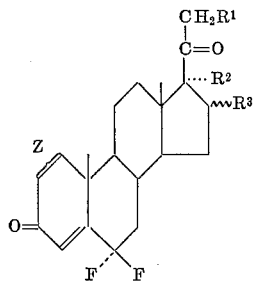

wherein $R^1$ is fluoro or chloro;
$R^2$ is hydrogen, hydroxy, or a conventional hydrolyzable ester;
$R^3$ is hydrogen, hydroxy or methyl; provided $R^3$ is methyl when $R^1$ is fluoro, and $R^2$ is hydrogen, hydroxy or a conventional hydrolyzable ester;
$R^2$ and $R^3$ when taken together are the group

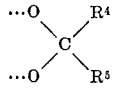

where each of $R^4$ and $R^5$ is, independently of each other, hydrogen, lower alkyl, halogenated lower alkyl, monocyclic cycloalkyl, monocyclic cycloalkyl lower alkyl, monocyclic aryl, monocyclic aryl lower alkyl, monocyclic heterocyclic, or monocyclic heterocyclic lower alkyl; or $R^4$ and $R^5$ taken together with the carbon atom to which they are joined are monocyclic cycloalkylidene or monocyclic heterocyclic ylidene; and
Z is a carbon-carbon single bond or a carbon-carbon double bond.

The wavy line at the C-16 position indicates that the $R^3$ substituent can be either in the α or β configuration.

Included within the present invention are 6-gem-difluoro steroids substituted at the C-21 position with fluoro or chloro; and optionally substituted at the C-16α position with hydroxy or methyl; at the C-16β positions with methyl; and at the C-17α position with hydroxy or an ester thereof. The present novel 6-gem-difluoro steroids are also optionally substituted with an acetal or ketal group bridging the 16α,17α-positions.

The novel 6-gem-difluoro steroids of the present invention possess progestational activity, and accordingly are thus useful in fertility control the management of dysmenorrhea, the treatment of uterine bleeding, and like conditions in which progestational agents are employed. The compounds of the present invention can be administered by the known pharmacological routes, such as orally, parenterally, or the like. The dosage unit will depend upon various factors including the type of condition being treated, the physical condition of the patient and the patient's response to the dosage unit. Generally, a dose of about 0.002 to about 0.33 mg. per kilogram of body weight is employed. The compounds are given in conventional forms, such as pills, powders, pellets, syrups, solutions, suspensions and capsules; alone or in conjunction with pharmaceutically acceptable excipients. Representative pharmaceutically acceptable excipients are lactose, magnesium stearate, water and saline solution.

The term "lower alkyl" denotes a group comprising a straight or branch chain aliphatic hydrocarbon of from 1 to 6 carbon atoms. Typical lower alkyl groups include methyl, ethyl, isopropyl, butyl, hexyl, and the like. The term "halogenated lower alkyl" denotes a lower alkyl substituted with one or more halo atoms, preferably fluoro or chloro. Representative halogenated lower alkyl are trichloromethyl, trifluoromethyl, fluoromethyl, dichloromethyl, 2,2,2-trifluoroethyl, 3-bromopropyl, 4-chloro-4-fluorobutyl, 5,5-dichloropentyl and 6,6-difluorohexyl.

The term "monocyclic cycloalkyl" denotes a group comprising a cyclic hydrocarbon of 5 to 6 carbon atoms, i.e. cyclopentyl and cyclohexyl. The term "monocyclic cycloalkyl lower alkyl" denotes a lower alkyl group substituted with one cycloalkyl substituent, such as cyclopentylmethyl or 2-cyclohexylethyl.

The term "monocyclic aryl" denotes a phenyl group optionally substituted with 1 to 3 lower alkyl, hydroxy, fluoro, chloro or lower alkyloxy groups. Representative monocyclic aryl are phenyl, tolyl, 2,5-dihydroxyphenyl, fluorophenyl, 3,5-dichlorophenyl, 2,4,6-trimethoxyphenyl and 3,5-diethylphenyl.

The terms "monocyclic heterocyclic" and "monocyclic heterocyclic ylidene" denote ring molecules of 5 to 6 carbon atoms containing 1 or 2 oxygen, nitrogen or sulfur atoms in the ring. Typical monocyclic heterocyclics include furan, morpholine, piperidine, pyrrolidine, and the like. Typical monocyclic heterocyclic ylidenes include tetrahydrofuranylidene, pyridylidene, 1-thia-1-oxide-4,4-cyclohexylidene and the like.

The terms "monocyclic aryl lower alkyl" and "monocyclic heterocyclic lower alkyl" denote lower alkyl of from 1 to 6 carbon atoms substituted with a monocyclic aryl or monocyclic heterocyclic group; such as benzyl, phenethyl, tetrahydropyran-4-yl methyl, and 2-(4'-piperidino)ethyl.

The term "conventional hydrolyzable ester" as used herein denotes those hydrolyzable ester groups conventionally employed in the steroid art, preferably those derived from hydrocarbon carboxylic acids. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain or cyclic structure, and preferably contain from 1 to 12 carbon atoms. In addition, they can be substituted by functional groups, for example, hydroxy, alkoxy containing up to 6 carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-$\beta,\beta$-dimethylglutarate, acetoxyacetate, 2-chloro-4-nitrobenzoate, aminoacetate, diethylaminoacetate, piperidinoacetate, $\beta$-chloropropionate, trichloroacetate, $\beta$-chlorobutyrate, and the like.

The novel gem-difluoro compounds of the present invention are prepared from the corresponding 6-fluoro compounds. The novel process of the present invention can be illustrated by the following reaction sequence:

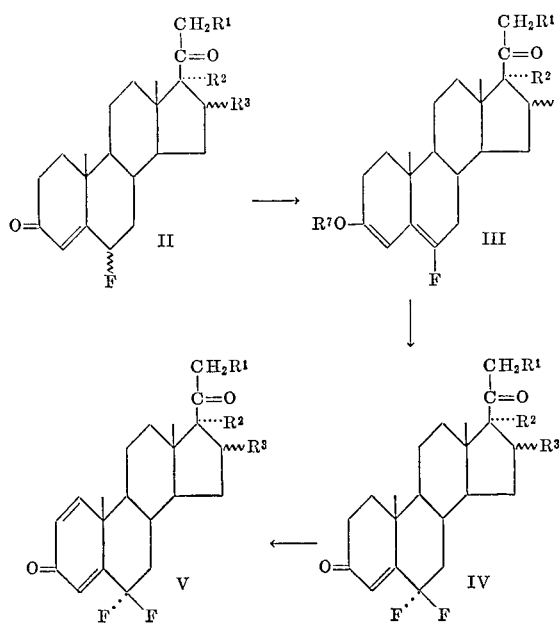

wherein $R^1$, $R^2$ and $R^3$ are as defined hereinbefore;
$R^7$ is lower alkyl, preferably methyl or ethyl; and
the wavy line at the C-16 position indicates that the $R^3$ substituent can be either in the $\alpha$ or $\beta$ configuration.

The present novel 6-gem-difluoro steroids, the compounds of Formula I can be prepared from the corresponding 6-fluoro steroids, the compounds of Formula II, in three steps. First step, the 3-alkoxy-$\Delta^{3,5}$-6-fluoro steroids, the compounds of Formula III, are prepared from the corresponding 6-fluoro starting steroids, the compounds of Formula II. Second step, the novel 6-gem-difluoro steroids, the compounds of Formula IV are prepared from the corresponding compounds of Formula III by the novel process of the present invention. Third step, the novel $\Delta^{1,4}$-6-gem-difluoro steroids, the compounds of Formula V, are in turn prepared from the corresponding novel compounds of Formula IV.

The compounds of Formula III, the 3-enol ethers of the 6-fluoro starting steroids of Formula II, are prepared from the compounds of Formula II by conventional techniques known to the art. For example, the compounds of Formula II are treated with an alkyl orthoformate, preferably methyl orthoformate or ethyl orthoformate in the presence of an acid catalyst, such as sulfuric acid, p-toluenesulfonic acid, and the like, in an inert non-aqueous, preferably anhydrous, organic solvent to afford the compounds of Formula III.

The compounds of Formula III are then isolated by conventional techniques; for example, the reaction mixture is neutralized with aqueous base and water is added to solidify the enol ether derivatives. The solid is then collected by filtration.

The compounds of Formula III are then treated with perchloryl fluoride in an inert, non-aqueous, preferably anhydrous aprotic organic solvent, as for example, a N,N-dialkyl hydrocarbon carboxylic amide, such as dimethylformamide, dimethylacetamide, and the like, to furnish the novel compounds of Formula IV. The reaction is conducted at temperatures in the range of from about 0° C. to about 100° C., conveniently at room temperature. At least a molar equivalent of perchloryl fluoride is used per molar equivalent of the compound of Formula III, and generally two or more molar equivalents of perchloryl fluoride are utilized.

The novel 6-gem-difluoro steroids, the compounds of Formula IV, are isolated by conventional techniques. For example, the reaction mixture is cautiously neutralized with an aqueous basic solution and the novel product is crystallized by the addition of water. The solid product is collected by filtration. The product can then be purified by dissolving in an inert organic solvent, immiscible with water, as for example, a halogenated hydrocarbon, such as methylene chloride, or a water-immiscible ether, such as diethylether; washing with water to neutrality, drying and evaporating to dryness. The product can be further purified by recrystallization, chromatography, and the like. The novel compounds of Formula IV are the novel 6-gem-difluoro steroids of Formula I wherein Z is a carbon-carbon single bond.

The 6-fluoro group of the 6-fluoro starting steroid of Formula II is either in the alpha or beta configuration. The present process is operable with starting steroids possessing either the 6$\alpha$- or 6$\beta$-fluoro configuration.

The $\Delta^1$ unsaturation, the C-1,2 double bond, is introduced into the novel compounds of Formula IV by conventional techniques to furnish the novel $\Delta^{1,4}$ compounds of Formula V. For example, the novel compounds of Formula IV can be refluxed with selenium dioxide in the presence of t-butanol and pyridine, or refluxed with selenium dioxide and chlorobenzene, or refluxed with 2,3-dichloro-5,6-dicyano-1,4-benzoquinone to afford the compounds of Formula V. The compounds of Formula V are the novel 6-gem-difluoro steroids of Formula I, wherein Z is a carbon-carbon double bond.

The compounds of Formula V are isolated by conventional techniques. For example, the reaction mixture may be evaporated to dryness, the residue taken up in an inert organic solvent immiscible with water, washed to neutrality, dried and evaporated to dryness. The compounds can be further purified by recrystallization, chromatography, and the like.

The 6-fluoro starting steroids employed in the present process and used to prepare the present novel 6-gem-difluoro steroids are described in the literature and in United States and foreign patents. For example, see U.S. Pats. 2,983,737, 2,983,739, 3,053,838, 3,057,858, 3,124,251, 3,126,375, 3,201,391 and 3,248,389.

In addition, the 6-fluoro starting steroids can be prepared by conventional techniques well-known to the art from steroids of the following formula:

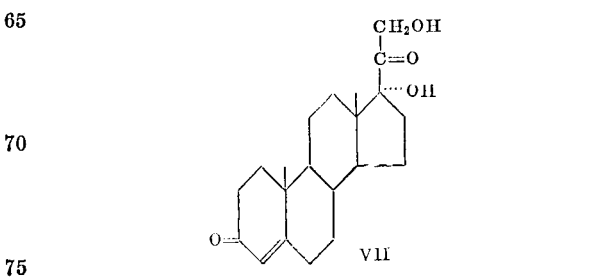

For example, the 6-fluoro group is introduced by treating a 6-alkoxy-$\Delta^{3,5}$ steroid with perchloryl fluoride in dimethylformamide.

The 16-methyl group is introduced by treating the corresponding 20-keto-$\Delta^{16}$ steroid with methyl magnesium bromide in the presence of cuprous chloride in an ether such as tetrahydrofuran. The 20-keto-$\Delta^{16}$ steroid is prepared by preparing the 3,20-bis-semicarbazone of a 3,20-diketo-17α-hydroxy steroid, treating it with glacial acetic acid and acetic anhydride and then allowing the resulting product to react with aqueous pyruvic acid.

The 17α-hydroxy group is introduced in conjunction with the 16 methyl group by first treating the corresponding 16-methyl-$\Delta^{16}$ steroid (which is prepared by treating the corresponding $\Delta^{16}$ steroid with diazomethane and then heating the resulting product to 180° C.) with hydrogen peroxide, in an aqueous basic media, then permitting the resulting 16,17-oxido-16-methyl steroid to react with hydrogen bromide in glacial acetic acid. The resulting 17-hydroxy-16-methylene steroid is hydrogenated with the use of a palladium catalyst to afford the corresponding 16-methyl-17α-hydroxy derivative.

The 16α,17α-dihydroxy groups are introduced by treating a $\Delta^{16}$ steroid derivative with potassium permanganate, acetone and acetic acid. The 16α,17α-acetal or ketal groups are introduced by treating the corresponding 16α,17α-dihydroxy steroid in presence of perchloric acid with a lower alkanal, such as paraldehyde, propanal, and hexanal; halogenated lower alkanal, such as chloral hydrate, trifluoroacetaldehyde hemiacetal and heptafluorobutanal ethyl hemiacetal; a di(lower alkyl) ketone, such as acetone, diethylketone, dibutylketone, methylethylketone, and methylisobutylketone; a halogenated di(lower alkyl) ketone, such as 1,1,1-trifluoroacetone; a cycloalkanone, such as cyclopentanone, cyclohexanone, cyclobutanone, and cyclodexanone; mono and dicycloalkyl ketone, such as cyclohexylmethyl ketone and dicyclopropyl ketone; a monocyclic aromatic aldehyde, such as benzaldehyde, halobenzaldehyde (e.g. p-chlorobenzaldehyde and p-fluorobenzaldehyde), lower alkoxy benzaldehydes (e.g. o-anisaldehyde), di(lower alkoxy)benzaldehydes (e.g. veratraldehyde), hydroxybenzaldehydes (e.g. salicylaldehyde), dihydroxy benzaldehydes (e.g. resorcylaldehyde), lower alkyl benzaldehydes (e.g. m-tolualdehyde and p-ethylbenzaldehyde), di(lower alkyl) benzaldehydes (e.g. o,p-dimethylbenzaldehyde), acylamidobenzaldehydes (e.g. N - acetylanthranilaldehyde), monocyclic aromatic lower alkanals, such as phenylacetaldehyde, α-phenylpropionaldehyde, β-phenylpropionaldehyde, γ-phenylbutyraldehyde, and aromatically-substituted halo, lower alkoxy, hydroxy, lower alkyl, acylamido and derivatives thereof; monocyclic heterocyclic aldehydes, such as picolinaldehydes, furfural, thiophene carbonals and halo, lower alkoxy, hydroxy, and lower alkyl derivatives thereof; a monocyclic heterocyclic lower alkanal such as oxacyclopen-4-yl acetaldehyde; a monocyclic aromatic lower alkyl ketone, such as acetophenone, propiophenone, butyrophenone, valerophenone, isocaprophenone, halophenyl lower alkyl ketones (e.g. p-chloroacetophenone, p - fluoroacetophenone, p - chloropropiophenone and p-fluoropropiophenone), (lower alkoxy) phenyl lower alkyl ketones (e.g. p-anisyl methyl ketone), di(lower alkoxy) phenyl lower alkyl ketones, hydroxyphenyl lower alkyl ketones, dihydroxyphenyl lower alkyl ketones (e.g. resacetophenone), (lower alkyl)phenyl lower alkyl ketones (e.g. methyl p-tolyl ketone), di(lower alkyl) phenyl lower alkyl ketones (o,p-xylyl methyl ketone), and acylamidophenyl lower alkyl ketones (e.g. acetanilines), benzophenone, and monor or bis substituted fluoro or chloro, lower alkoxy, hydroxy, lower alkyl, acylamido derivatives thereof; a monocyclic aromatic lower alkanone, such as 1-phenyl-3-butanone and 1-phenyl-4-pentanone, and aromatically substituted derivatives thereof; monocyclic heterocyclic ketones, such as 2-acetylfuran, 2-benzoylfuran, and 2-acetylthiophene; monocyclic heterocyclic lower alkanones; and monocyclic heterocyclic ketones, such as alloxan; and oxo (lower)alkanoic acids such as glyoxylic acid, pyruvic acid, acetoacetic acid β-keto propionic acid α-keto butyric acid, lavulinic acid, and β-keto caproic acid and β-keto caprylic acid (as well as salts and esters thereof, such as lower alkyl esters, e.g. methyl and ethyl).

The 21 chloro group is introduced by treating a 21-hydroxy steroid derivative with a molar equivalent of triphenyl phosphine in carbon tetrachloride, optionally in the presence of dimethylformamide or dimethylacetamide, at about room temperature.

The 21 fluoro group is introduced by tosylating a 21-hydroxy steroid derivative with tolylsulfonyl chloride in pyridine, then refluxing the resulting 21-tolylsulfonate ester with sodium iodide in acetone to get the corresponding 21-iodo steroid derivative; and lastly refluxing the latter with potassium fluoride in ethylene glycol.

The 17α-hydroxy groups are etherified and esterified by conventional methods well-known to the art. For example, a 17α-hydroxy steroid is etherified by treating it with sodium hydride and then allowing it to react with an alkyl halide, or the like, and a 17α-hydroxy steroid is esterified by treating it with an acid anhydride in pyridine.

The unsaturation at C–5,6 is introduced by treating the corresponding 3-keto-$\Delta^4$ compound with chloranil in a mixture of ethyl acetate and acetic acid or xylene under nitrogen while refluxing. The mixture is heated at reflux for a period of from 20 hours to 100 hours. After the reaction is over, the reaction mixture is allowed to cool and then is washed with cold, aqueous alkali metal hydroxide solutions.

The following examples are intended to further illustrate and typify the nature of this invention. These examples are presented solely for the purpose of exemplification, and they should not be construed as a limitation on the scope of the invention.

EXAMPLE 1

Part A: To a suspension of 1 g. of 6α,21-difluoro-16α,17α-isopropylidenedioxypregn - 4 - ene - 3,20 - dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and then allowed to stand at room temperature for 30 minutes. There is then added 0.8 ml. of pyridine, followed by water until solidification occurs. This solid is collected by filtration, washed with water and air dried to yield 3-ethoxy-6α,21-difluoro-16α,17α-isopropylidenedioxypregna-3,5 - dien - 20 - one, which is recrystallized from acetone:hexane.

Part B: A stream of perchloryl fluoride is passed through a solution of 1 g. of 3-ethoxy-6α,21-difluoro-16α,17α-isopropylidenedioxypregna-3,5-dien-20-one in 25 ml. of dimethylformamide, cooled to 20° C. for 95 minutes. After being allowed to slowly attain a temperature of 25° C., the solution is poured into water and extracted with ethyl acetate. These extracts are washed with saturated aqueous sodium bicarbonate solution and with water to neutrality, dried over sodium sulfate and evaporated to dryness to yield 6α,6β, 21-trifluoro-16α,17α-isopropylidenedioxypregn-4-ene - 3,20 - dione, which is recrystallized from acetone:hexane.

Similarly, 6α,6β,21 - trifluoro-16α,17α-isopropylidenedioxypregn-4-ene-3,20-dione is obtained when 6β,21-difluoro - 16α,17α-isopropylidenedioxypregn - 4 - ene - 3,20-dione is employed in the above processes of Example 1 as the 6-fluoro starting steroid.

Part C: A mixture of 1 g. of 6α,6β,21-trifluoro-16α,17α-isopropylidenedioxypregn-4-ene-3,20-dione, 50 ml. of t-butanol, 0.4 g. of recently sublimed selenium dioxide and 0.2 ml. of pyridine is refluxed under nitrogen for 48 hours, cooled and filtered through Celite diatomaceous earth. The filtrate is evaporated under reduced pressure and the residue dissolved in acetone. This solution is refluxed in the presence of charcoal for 1 hour, filtered through Celite diatomaceous earth and evaporated. The residue is then chromatographed on neutral alumina to yield 6α,6β,21 - trifluoro - 16α,17α - isopropylidenedioxy-pregna-1,4-diene-3,20-dione.

By the method of the processes of Parts A and B 6α,6β,21 - trifluoro - 16α,17α - cyclohexylidenedioxypregn-4 - ene - 3,20 - dione; 6α,6β - difluoro-16α,17α-isopropylidenedioxy - 21 - chloropregn - 4 - ene - 3,20 - dione; 6α,6β,21 - trifluoro - 16α,17α-(1'-phenyl-1'-methylmethylidenedioxy)pregn - 4 - ene - 3,20-dione; 6α,6β-difluoro-16α,17α-(3',3' - tetrahydrofuranylidenedioxy) - 21-chloropregn - 4 - ene - 3,20 - dione; 6α,6β-difluoro-21-chloro-16α,17α - (4',4' - piperidylidenedioxy)pregn-4-ene-3,20-dione; 6α,6β,21 - trifluoro - 16α,17α - (3',3' - hexylidenedioxy)pregn - 4 - ene - 3,20 - dione; 6α,6β-difluoro-21-chloro - 16α,17α - cyclopentylidenedioxypregn - 4 - ene-3,20 - dione; 6α,6β,21 - trifluoro - 16α,17α - (3',3'-pentylidenedioxy)pregn - 4 - ene - 3,20 - dione; and 6α,6β-difluoro - 21 - chloro - 16α,17α - (1' - phenyl -1'-methylmethylidenedioxy)pregn - 4 - ene - 3,20 - dione are prepared from the corresponding 6α- or 6β-fluoro steroids.

By employing the above novel Δ⁴-6-gem-difluoro compounds as starting materials in the process of Part C, the following novel Δ¹,⁴ - 6 - gem-difluoro steroids are respectively prepared: 6α,6β,21 - trifluoro - 16α,17α-cyclohexylidenedioxypregn - 4 - ene - 3,20 - dione; 6α,6β-difluoro - 16α,17α - isopropylidenedioxy - 21 - chloropregna - 1,4 - diene - 3,20 - dione; 6α,6β,21-trifluoro-16α,17α - (1' - phenyl - 1' - methylmethylidenedioxy)pregna - 1,4 - diene - 3,20 - dione; 6α,6β - difluoro - 16α,17α - (3',3' - tetrahydrofuranylidenedioxy) - 21-chloropregna - 1,4 - diene - 3,20 - dione; 6α,6β - difluoro-21-chloro - 16α,17α - (4',4' - piperidylidenedioxy)pregna-1,4 - diene - 3,20 - dione; 6α,6β,21-trifluoro-16α,17α-(3',3' - hexylidenedioxy)pregna - 1,4 - diene - 3,20-dione; 6α,6β - difluoro - 21 - chloro - 16α,17α-cyclopentylidenedioxypregna - 1,4 - diene - 3,20 - dione; 6α,6β,21-trifluoro-16α,17α - (3',3' - pentylidenedioxy)pregna - 1,4 - diene-3,20 - dione and 6α,6β - difluoro - 21 - chloro - 16α,17α-(1' - phenyl - 1' - methylmethylenedioxy)pregna - 1,4-diene-3,20-dione are obtained.

EXAMPLE 2

The following compounds are prepared from the corresponding 6α- and/or 6β-fluoro steroids by employing the latter as starting materials in Part A of the process of Example 1, and subsequently employing the resulting 3-ethoxy-Δ³,⁵ steroids as starting materials in Part B of the process of Example 1:

6α,6β-difluoro-16α,17α-(3',3'-pentylidenedioxy)-21-chloropregn-4-ene-3,20-dione;

6α,6β-difluoro-16α,17α-(diphenylmethylenedioxy)-21-chloropregn-4-ene-3,20-dione;

6α,6β-difluoro-21-chloro-16α,17α-(cyclohexylidenedioxy)-pregn-4-ene-3,20-dione;

6α,6β,21-trifluoro-16α,17α-(dicyclopentylmethylenedioxy)-pregn-4-ene-3,20-dione;

6α,6β,21-trifluoro-16α,17α-cyclopentylidenedioxy-pregn-4-ene-3,20-dione;

6α,6β-difluoro-16α,17α-(1'-thia-4',4'-cyclohexylidenedioxide)-21-chloropregn-4-ene-3,2-dione;

6α,6β-difluoro-16α,17α-(N-methyl-4',4'-piperidylidenedioxy)-21-chloropregn-4-ene-3,20-dione;

6α,6β,21-trifluoro-16α,17α-(4',4'-piperidylidenedioxy)-pregn-4-ene-3,20-dione;

6α,6β-difluoro-16α,17α-(1'-thia-4',4'-cyclohexylidenedioxy)-21-chloropregn-4-ene-3,20-dione;

6α,6β-difluoro-16α,17α-(4',4'-tetrahydropyanylidenedioxy)-21-chloropregn-4-ene-3,20-dione;

6α,6β,21-trifluoro-16α,17α-(2',2'-hexylidenedioxy)pregn-4-ene-3,20-dione; and

6α,6β,21-trifluoro-16α,17α-(2'-thia-3',3'-cyclohexylidenedioxy dioxide)pregn-4-ene-3,20-dione.

By employing the above novel 6-gem-difluoro steroids as starting materials in Part C of the process of Example 1 or Part C of the process of Example 3, the corresponding Δ¹,⁴-6-gem-difluoro steroids are obtained.

EXAMPLE 3

Part A: To a suspension of 1 g. of 6α-fluoro-17α-hydroxy-16α-methyl-21-chloropregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air-dried to yield 3-ethoxy-6-fluoro-17α-hydroxy-16α-methyl-21-chloropregn-3,5-dien-20-one, which is recrystallized from acetone:hexane.

Part B: A stream of perchloryl fluoride is passed through a solution of 1 g. of 3-ethoxy-6-fluoro-17α-hydroxy-16α-methyl-21-chloropregna-3,5-dien-20-one in 25 ml. of dimethylformamide, cooled to 0° C., for 5 minutes. After being allowed to slowly attain a temperature of 20° C., the solution is poured into water and extracted with ethyl acetate. These extracts are washed with a saturated aqueous sodium bicarbonate solution and then with water to naturality, dried over sodium sulfate and evaporated to dryness to yield 6α, 6β-difluoro-17α-hydroxy-16α-methyl-21-chloropregn-4-ene-3,20-dione, which is recrystallized from acetone:hexane.

Part C: A mixture of 0.5 g. of 6α,6β-difluoro-17α-hydroxy-16α-methyl-21-chloropregn-4-ene-3,20-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is filtered through 10 g. of alumina and concentrated to yield 6α,6β-difluoro-17α-hydroxy-16α-methyl - 21 - chloropregna-1,4-diene-3,20-dione.

Similarly, the following novel Δ⁴-6-gem-fluoro steroids are prepared from the corresponding Δ⁴-6α- or 6β-fluoro steroids:

6α,6β-difluoro-17α-hydroxy-16β-methyl-21-chloropregn-4-ene-3,20-dione;

6α,6β,21-trifluoro-17α-hydroxy-16α-methylpregn-4-ene-3,20-dione;

6α,6β-difluoro-16α,17α-dihydroxy-21-chloropregn-4-ene-3,20-dione;

6α,6β,21-trifluoro-17α-hydroxy-16β-methylpregn-4-ene-3,20-dione;

6α,6β,21-trifluoro-16α-methylpregn-4-ene-3,20-dione;

6α,6β-difluoro-17α-hydroxy-21-chloropregn-4-ene-3,20-dione;

6α,6β,21-trifluoro-16β-methylpregn-4-ene-3,20-dione;

6α,6β,21-trifluoropregn-4-ene-3,20-dione;

6α,6β-difluoro-21-chloropregn-4-ene-3,20-dione;

6α,6β-difluoro-16α-methyl-17α-valeryloxy-21-chloropregn-4-ene-3,20-dione; and

6α,6β,21-trifluoro-16α-methyl-17α-valeryloxypregn-4-ene-3,20-dione.

By employing the above novel Δ⁴-6-gem-fluoro steroids in the process of Part C the following novel Δ¹,⁴-6-gem-fluoro steroids are respectively prepared:

6α,6β-difluoro-17α-hydroxy-16β-methyl-21-chloropregna-1,4-diene-3,20-dione;

6α,6β,21-trifluoro-17α-hydroxy-16α-methyl-pregna-1,4-diene-3,20-dione;

6α,6β-difluoro-16α,17α-dihydroxy-21-chloropregna-1,4-diene-3,20-dione;

6α,6β,21-trifluoro-17α-hydroxy-16β-methylpregna-1,4-diene-3,20-dione;

6α,6β,21-trifluoro-16α-methylpregna-1,4-diene-3,20-dione;

6α,6β-difluoro-17α-hydroxy-21-chloropregna-1,4-diene-3,20-dione;

6α,6β,21-trifluoro-16β-methylpregn-4-ene-3,20-dione;
6α,6β,21-trifluoropregna-1,4-diene-3,20-dione;
6α,6β-difluoro-21-chloropregna-1,4-diene-3,20-dione;
6α,6β-difluoro-16α-methyl-17α-valeryloxy-21-chloropregna-1,4-diene-3,20-dione; and
6α,6β,21-trifluoro-16α-methyl-17α-valeryloxypregna-1,4-diene-3,20-dione.

EXAMPLE 4

The following 6-gem-difluoro steroids are prepared via the methods of Steps A and B of Example 3 from the corresponding 6-fluoro steroids:

6α,6β,21-trifluoro-16α-methyl-17α-acetoxypregn-4-ene-3,20-dione;
6α,6β-difluoro-17α-valeryloxy-21-chloropregn-4-ene-3,20-dione;
6α,6β-difluoro-16α-methyl-17α-acetoxy-21-chloropregn-4-ene-3,20-dione;
6α,6β-difluoro-17α-acetoxy-21-chloropregn-4-ene-3,20-dione;
6α,6β-difluoro-16α-methyl-21-chloropregn-4-ene-3,20-dione;
6α,6β-difluoro-16α-methyl-17α-caproxy-21-chloropregn-4-ene-3,20-dione;
6α,6β-difluoro-16β-methyl-17α-propionyloxy-21-chloropregn-4-ene-3,20-dione.

By employing the above 6-gem-difluoro-Δ⁴-steroids as starting materials in the process of Part C of Example 3, the corresponding 6-gem-difluoro-Δ¹,⁴ steroids are prepared. For example, 6α,6β-difluoro-17α-valeryloxy-21-chloropregna-1,4-diene-3,20 - dione; 6α,6β-difluoro-17α-acetoxy-21-chloropregna - 1,4 - diene-3,20-dione; 6α,6β-difluoro-16α-methyl-17α-acetoxy - 21 - chloropregna-1,4-diene-3,20-dione; and 6α,6β,21-trifluoro-16α-methyl-17α-acetoxypregna-1,4-diene-3,20-dione are respectively prepared from 6α,6β-difluoro-17α-valeryloxy-21-chloropregn-4-ene-3,20-dione; 6α,6β-difluoro-17α - acetoxy-21-chloropregn-4-ene; 6α,6β-difluoro-16α-methyl-17α-acetoxy - 21-chloropregna-4-ene-3,20-dione; and 6α,6β,21-trifluoro-16α-methyl-17α-acetoxypregna-4-ene-3,20-dione.

What is claimed is:

1. The compounds of the formula

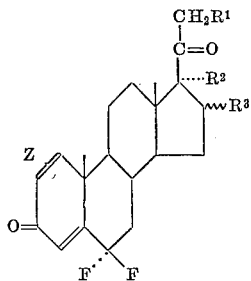

wherein
R¹ is fluoro or chloro;
R² is hydrogen, hydroxy, or a conventional hydrolyzable ester;
R³ is hydrogen, hydroxy or methyl; provided that R³ is methyl when R¹ is fluoro, and R² is hydrogen, hydroxy or a conventional hydrolyzable ester;
R² and R³ when taken together are the group

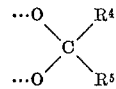

where each of R⁴ and R⁵ is, independently of each other, hydrogen, lower alkyl, halogenated lower alkyl, monocyclic cycloalkyl, monocyclic cycloalkyl lower alkyl, monocyclic aryl, monocyclic aryl lower alkyl, monocyclic heterocyclic, monocyclic heterocyclic lower alkyl, or R⁴ and R⁵ together with the carbon atom to which they are joined are monocyclic cycloalkylidene or monocyclic heterocyclic ylidene; and
Z is a carbon-carbon single bond or a carbon-carbon double bond.

2. The compounds according to claim 1 wherein R² is hydrogen, hydroxy, acetoxy, or valeryloxy; and each of R⁴ and R⁵, independently of each other, is phenyl, methyl, ethyl, propyl, or butyl; or R⁴ and R⁵ taken together with the carbon atom to which they are joined are cyclopentylidene, cyclohexylidene, 4',4' - tetrahydropyranylidene, 4',4'-piperidylidene, N-methyl-4',4'-piperidylidene, N-ethyl-4',4'-piperidylidene, 1' - thia-4',4'-cyclohexylidene, 1'-thia-4',4'-cyclohexylidene oxide or 1'-thia-4',4'-cyclohexylidene dioxide.

3. A compound according to claim 2 which is 6α,6β-difluoro-17α-hydroxy-21-chloropregn-4-ene-3,20-dione.

4. The compound according to claim 2 which is 6α,6β-difluoro-17α-hydroxy-21-chloropregna - 1,4 - diene-3,20-dione.

5. The compounds according to claim 2 which are the acetate and valerate esters of 6α,6β-difluoro-17α-hydroxy-21-chloropregn-4-ene-3,20-dione.

6. The compounds according to claim 2 which are the acetate and valerate esters of 6α,6β-difluoro-17α-hydroxy-21-chloropregna-1,4-diene-3,20-dione.

7. The compounds according to claim 2 which are 6α,6β-difluoro-16α-methyl-17α-hydroxy - 21 - chloropregn-4-ene-3,20-dione and the acetate and valerate esters thereof.

8. The compounds according to claim 2 which are 6α,6β-difluoro-16-α-methyl - 17α - hydroxy-21-chloropregna-1,4-diene-3,20-dione and the acetate and valerate esters thereof.

9. The compound according to claim 2 which is 6α,6β-fluoro-16α,17α-isopropylidenedioxy - 21 - chloropregn-4-ene-3,20-dione.

10. The compound according to claim 2 which is 6α,6β - difluoro-16α,17α-isopropylidenedioxy-21-chloropregn-1,4-diene-3,20-dione.

11. The compound according to claim 2 which is 6α,6β-difluoro - 16α,17α - (1' - phenyl-1'-methylmethylenedioxy)-21-chloropregn-4-ene-3,20-dione.

12. The compound according to claim 2 which is 6α,6β-difluoro-16α,17α-(1'-phenyl - 1' - methylmethylenedioxy)-21-chloropregn-1,4-diene-3,20-dione.

13. The compound according to claim 2 which is 6α,6β,21 - trifluoro-16α-methyl - 17α - hydroxypregn-4-ene-3,20-dione.

14. The compound according to claim 2 which is 6α,6β,21-trifluoro - 16α - methyl-17α - hydroxypregn-1,4-diene-3,20-dione.

15. The compounds according to claim 2 which are the acetate and valerate esters of 6α,6β,21-trifluoro-16α-methyl-17α-hydroxypregna-4-ene-3,20-dione.

16. The compounds according to claim 2 which are the acetate and valerate esters of 6α,6β,21-trifluoro-16α-methyl-17α-hydroxypregna-1,4-diene-3,20-dione.

17. The compound according to claim 2 which is 6α,6β,21-trifluoro - 16α,17α - isopropylidenedioxypregn - 4-ene-3,20-dione.

18. The compound according to claim 2 which is 6α,6β,21-trifluoro - 16α,17α - isopropylidenedioxypregna-1,4-diene-3,20-dione.

19. The compound according to claim 2 which is 6α,6β,21-trifluoro-16α,17α-(1'-phenyl - 1' - methylmethylenedioxy)pregn-4-ene-3,20-dione.

20. The compound according to claim 2 which is 6α,6β,21-trifluoro-16α,17α-(1'-phenyl - 1' - methylmethylenedioxy)pregna-1,4-diene-3,20-dione.

References Cited

UNITED STATES PATENTS 3,219,673  11/1965  Boswell _____ 260—397.3
3,468,917  9/1969  Westerhof et al. ____ 260—397.3

HENRY A. FRENCH, Primary Examiner

U.S. Cl. X.R.

260—397.3, 397.47, 999

UNITED STATES PATENT OFFICE
CERTIFICATE OF CORRECTION

Patent No. 3,629,242          Dated December 21, 1971

Inventor(s) John H. Fried

It is certified that error appears in the above-identified patent and that said Letters Patent are hereby corrected as shown below:

Column 3, lines 20 to 31 (formula III) should appear as follows:

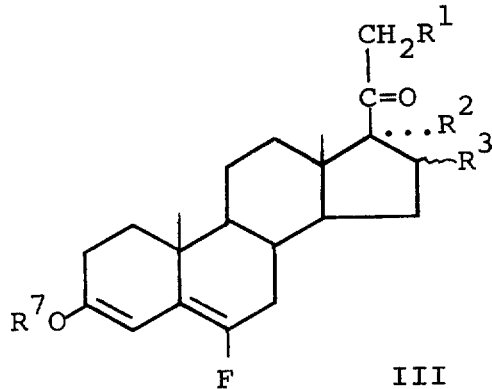

Column 5, line 69, "monor" should be -- mono --.
Column 7, line 63, "idenedioxide)-21-chloropregn-4-ene-3,20-dione;" should be -- idenedioxy oxide)-21-chloropregn-4-ene-3,20-dione; --.

Signed and sealed this 27th day of June 1972.

(SEAL)
Attest:

EDWARD M. FLETCHER, JR.          ROBERT GOTTSCHALK
Attesting Officer                Commissioner of Patents